United States Patent [19]
Atkinson et al.

[11] Patent Number: 4,968,158
[45] Date of Patent: Nov. 6, 1990

[54] ENGINE BEARING ASSEMBLY
[75] Inventors: Edward Atkinson, Morrow; Duane H. Anstead, Fairfield, both of Ohio
[73] Assignee: General Electric Company, Cincinnati, Ohio
[21] Appl. No.: 292,977
[22] Filed: Jan. 3, 1989
[51] Int. Cl.⁵ .................. F16C 19/52; F16C 19/06
[52] U.S. Cl. ................... 384/535; 384/476; 384/492; 384/540; 384/907.1
[58] Field of Search .............. 384/467, 466, 473–475, 384/476, 492, 493, 535, 540, 557, 562, 581, 584–585, 900, 907.1

[56] References Cited
U.S. PATENT DOCUMENTS

| | | | |
|---|---|---|---|
| 3,269,786 | 8/1966 | Diver et al. | 384/475 |
| 3,480,342 | 11/1969 | Venable | 384/476 |
| 3,640,591 | 2/1972 | Eklund | 384/493 X |
| 4,496,252 | 1/1985 | Horler et al. | 384/215 |
| 4,500,143 | 2/1985 | Kervistin et al. | 384/467 |

FOREIGN PATENT DOCUMENTS

| | | | |
|---|---|---|---|
| 0095196 | 11/1983 | European Pat. Off. | |
| 175313 | 8/1986 | Japan | 384/493 |
| 674738 | 7/1952 | United Kingdom | |

OTHER PUBLICATIONS
Technical Report AFAPL-TR-74-77, vol. 1, Aug., 1974, "High Temperature, High Speed, Solid Lubricated Bearing Technology Phase I—Heat Transfer", by Paul R. Bissett.
Lubrication Engineering, vol. 37, No. 7, Jul., 1981, "Operation of an All—Ceramic Mainshaft Roller Bearing in a J—402 Gas—Turbine Engine", G. Hamburg et al.

Primary Examiner—Thomas R. Hannon
Attorney, Agent, or Firm—Douglas E. Erickson; Jerome C. Squillaro

[57] ABSTRACT

A dry rolling element bearing assembly for rotatably mounting a flight vehicle engine shaft to a housing. Rolling elements (such as ball bearings) are positioned between inner and outer races. Stop devices axial position the inner and outer races. A mounting device positions the inner race radially outward from the shaft so as to create a first annular air space between them. The mount has a flexible portion and has a support ring portion which contacts the outer surface of the inner race with a radial interference fit. A similar mounting device positions the outer race radially inward from the housing. Air directing devices direct cooling air impingingly against bearing surfaces.

12 Claims, 2 Drawing Sheets

ENGINE BEARING ASSEMBLY

BACKGROUND OF THE INVENTION

The present invention relates generally to bearing assemblies and more particularly, to a high temperature rolling element bearing assembly which does not require liquid lubrication.

A rolling element bearing assembly typically includes a rolling element bearing and mounting devices, with the rolling element bearing having roller bearings or ball bearings, rolling element retainers (also known as cages or separators), and inner and outer races, and with the mounting devices positioning the inner race with respect to a shaft and the outer race with respect to a housing. Conventional aircraft engine rolling element bearing assemblies are lubricated by oil having a limiting operating temperature of approximately 400 degrees F. Advanced engines for high Mach flight vehicles are projected to have bearing assembly environmental temperatures as high as 1000 degrees F. One approach that has been studied is the use of dry bearings. A dry bearing is a bearing which has no lubrication or has solid lubrication, such as a dry powder. Suggested bearing materials include ceramics such as silicon nitride which can survive high temperature environments.

For instance, in *Lubrication Engineering*, Vol. 37, No. 7, July, 1981, on pages 407–415 there is disclosed a rolling element bearing assembly in an article entitled "Operation of an All- Ceramic Mainshaft Roller Bearing in a J-402 Gas-Turbine Engine". The inner race is 0.0031 in. loose on the shaft at room temperature but attains a line fit at the maximum design temperature. The outer race is mounted in a compliant ring.

The inventors are also aware of work done in 1984 by others which proposed a dry rolling element bearing assembly design. The assembly included a ceramic inner race apparently held in contact with the metal engine shaft by a metal collar attachment mounted with an interference fit to the shaft and to the outer surface of the inner race allowing a more compliant inner race supporting system. The proposed design also included an outer race attached to a housing through an intermediate spacer material.

However, the ceramic bearing materials have coefficients of thermal expansion which are generally only one-third the value of the coefficients of thermal expansion of the steel shaft or housing. This mismatch in thermal expansion creates a major mounting problem since the ceramic bearing rings (inner and outer races) expand differentially relative to the shaft or housing, and large thermally induced stresses will lead to rapid failure of the more brittle ceramic components. Typically a bearing inner race is mounted on the shaft with an interference between the shaft outside diameter and the inner race bore. This generates a tensile hoop stress which can induce failure by a mechanism of crack propagation. Ceramic materials are less capable than metals of sustaining a tensile hoop stress without fracturing. The combination of low expansion and low fracture toughness makes it difficult to mount any ceramic race.

Another problem with dry rolling element bearing assemblies has been that they require greater cooling than do liquid lubricated bearing systems because of the dry bearings' higher friction which generates more concentrated heat. Also, removing heat from a dry bearing assembly by air cooling is more difficult than removing heat from a liquid lubricated bearing assembly by utilizing the liquid lubricant for heat removal. In Air Force Aero Propulsion Laboratory (Air Force Systems Command, Wright- Patterson Air Force Base, Ohio) Technical Report AFAPL-TR-74-77, Volume 1, Aug. 1974, entitled "High Temperature, High Speed, Solid Lubricated Bearing Technology Phase I—Heat Transfer" by Paul R. Bissett et al., impingement air cooling techniques were applied to solid lubricated rolling element bearing assemblies. Impingement cooling may be defined as cooling with one or more jets of air which strike a bearing surface to be cooled at an angle (ideally ninety degrees) with respect to such bearing surface.

What is needed is a high-temperature rolling element bearing assembly for the engines of advanced flight vehicles.

SUMMARY OF THE INVENTION

It is an object of the invention to provide a high temperature dry rolling element bearing assembly.

It is another object of the invention to provide such a bearing assembly which is isolated from any differential thermal expansion of the shaft or housing.

It is a further object of the invention to provide such a bearing assembly which allows impingement air cooling of bearing surfaces inaccessible with conventional designs.

In a preferred embodiment, the dry rolling element bearing assembly for rotatably mounting a first race-attachment member (such as a shaft) to a second race-attachment member (such as a housing) includes multiple rolling elements positioned between inner and outer races. The inner race is axially positioned by a stop device attachable to the first race-attachment member (e.g., the shaft), and the outer race is axially positioned by a stop device attachable to the second race-attachment member (e.g., the housing). A first mounting device mounts the inner race to the first race-attachment member (e.g., the shaft), and a second mounting device mounts the outer race to the second race-attachment member (e.g., the housing). At least one (and preferably both) of the mounting devices is attachable to its corresponding race-attachment member and, when so attached, positions its corresponding race radially apart from its corresponding race-attachment member so as to create an annular air space between them. In an exemplary embodiment, apparatus for directing cooling air may be placed in the air space, such as apparatus for directing cooling air impingingly against a surface of a race.

Several benefits and advantages are derived from the invention. The first air space between the inner race's bore and the shaft and the second air space between the outer race's outer surface and the housing reduce the rate of heat flow and thermal growth mismatch between parts which are in contact in conventional designs. The first air space allows the placement of an impingement air cooling device to deliver jets of cooling air to the inner race's bore which was inaccessible to impingement air cooling in conventional designs. These advantages allow the bearing assembly design of the invention to withstand the greater operational temperatures in the engines of advanced flight vehicles.

BRIEF DESCRIPTION OF THE DRAWINGS

The accompanying drawings illustrate a preferred embodiment of the present invention wherein.

DETAILED DESCRIPTION OF THE INVENTION

Figure 1:
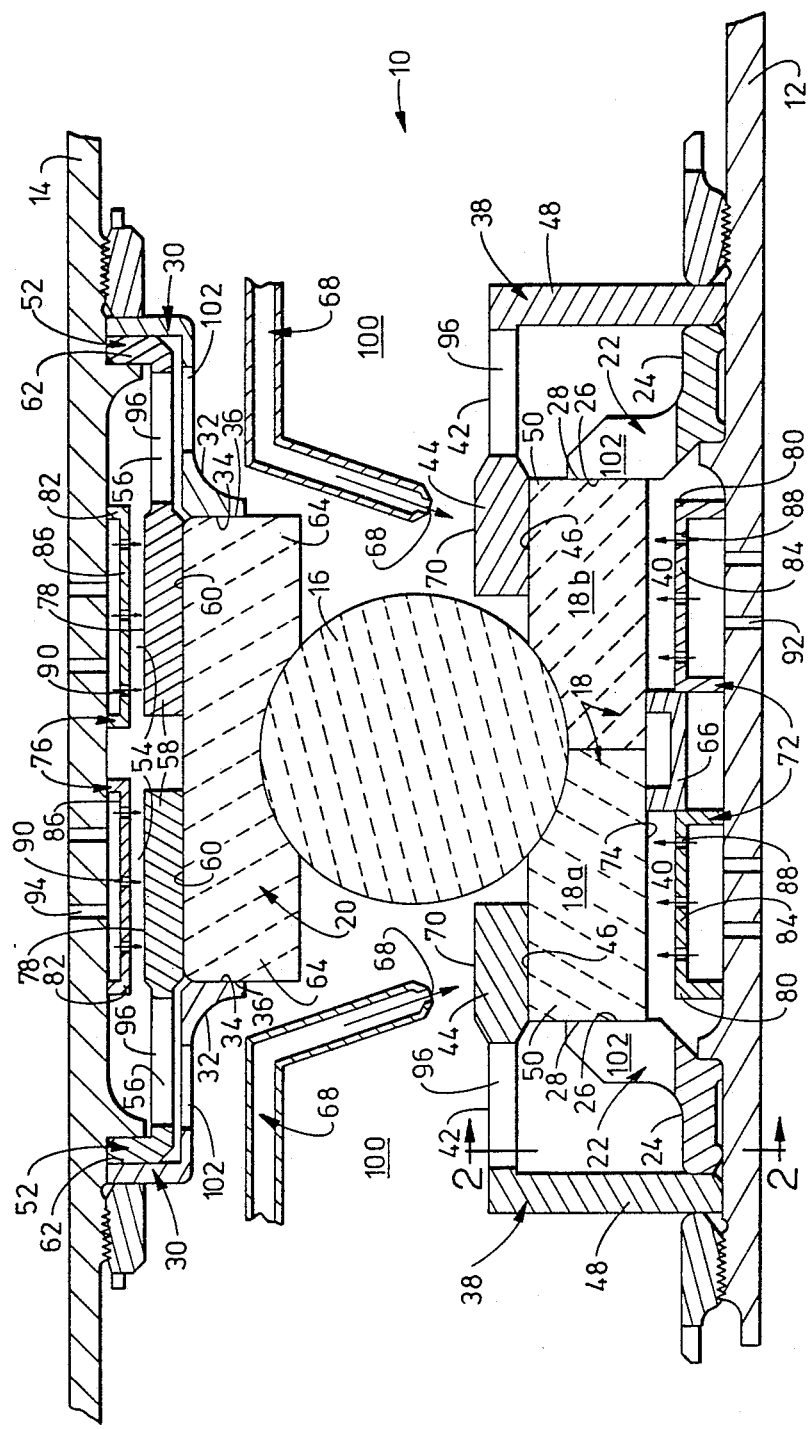
FIG. 1 is a cross sectional view of the dry rolling element bearing assembly of the invention taken along a plane longitudinally cutting the shaft through its centerline.

The dry rolling element bearing assembly 10 of the invention rotatably mounts a shaft 12 (a first race-attachment member) to a housing 14 (a second race-attachment member) which preferably is a generally cylindrical housing. The bearing assembly 10, as seen from FIGS. 1 and 2, includes a plurality of rolling elements 16, preferably ball bearings 16, which are disposed between inner and outer races 18 and 20. Conventional rolling element retainers (also called cages or separators), known to those skilled in the art, have been omitted from the Figures for clarity.

The bearing assembly 10 also includes first stop means 22, attachable to the shaft 12, for axially positioning the inner race 18. Preferably, such first stop means 22 include two axial race positioning stop rings 24 attached to the shaft 12 and having an end portion 26 axially abutting the annular end surfaces 28 of the inner race 18.

Likewise, the bearing assembly 10 has a second stop means 30, attachable to the housing 14, for axially positioning the outer race 20. Preferably, such second stop means 30 includes two axial race positioning stop rings 32 attached to the housing 14 and having an end portion 34 axially abutting the annular end surfaces 36 of the outer race 20. Other stop means include conventional axial race restraining devices as is known to those skilled in the art.

The bearing assembly 10 additionally includes first mounting means 38 for mounting the inner race 18 to the shaft 12. Preferably, the bearing assembly 10 includes first mounting means 38, attachable to the shaft 12, for disposing the inner race 18 radially outward from the shaft 12 so as to create a first air space 40 therebetween. Such first mounting means 38 has a first compliant portion 42 and has a first support ring portion 44 contacting the outer surface 46 of the inner race 18 with a radial interference fit when the first mounting means 38 is attached to the shaft 12. Preferably the first mounting means 38 includes a shaft mating ring portion 48 attachable to the shaft 12 with the first compliant portion 42 being a segmented and axially-extending cylindrical flexible member 42 connecting the shaft mating ring portion 48 with the first support ring portion 44. As seen from FIG. 1, an exemplary first mounting means 38 includes a shaft mating ring portion 48, a first compliant portion 42, and a first support ring portion 44 for each of the two axial ends 50 of the inner race 18.

Likewise, the bearing assembly 10 includes second mounting means 52 for mounting the outer race 20 to the housing 14. Preferably, the bearing assembly 10 includes such second mounting means 52, attachable to the housing 14, for disposing the outer race 20 radially inward from the housing 14 so as to create a second air space 54 therebetween. Such second mounting means 52 has a second compliant portion 56 and has a second support ring portion 58 contacting the outer surface 60 of the outer race 20 with a radial interference fit when the second mounting means 52 is attached to the housing 14. Preferably the second mounting means 52 includes a housing mating ring portion 62 attachable to the housing 14 with the second compliant portion 56 being a segmented and axially-extending cylindrical flexible member 56 connecting the housing mating ring portion 62 with the second support ring portion 58. As seen from FIG. 1, an exemplary second mounting means 52 includes a housing mating ring portion 62, a second compliant portion 56, and a second support ring portion 58 for each of the two axial ends 64 of the outer race 20. Other mounting means include the housing mating ring being replaced with discrete radial spokes, mounting means of unitary or segmented structure, and the like, as is known to those skilled in the art.

In an exemplary embodiment, the air spaces 40 and 54 are annular with separation maintained between the shaft 12 and the inner race 18 and between the housing 14 and the outer race 20 throughout the operating temperature range of the bearing 10.

The housing 14, the first and second stop means 22 and 30, and the first and second mounting means 38 and 52 typically are made of metal such as steel and have generally the same coefficient of thermal expansion. The rolling elements 16 and the inner and outer races 18 and 20 typically are made of ceramic material such as silicon nitride and have generally the same coefficient of thermal expansion. The coefficients of thermal expansion of the metal materials typically are each greater than each of the coefficients of thermal expansion of the ceramic materials.

Figure 2:
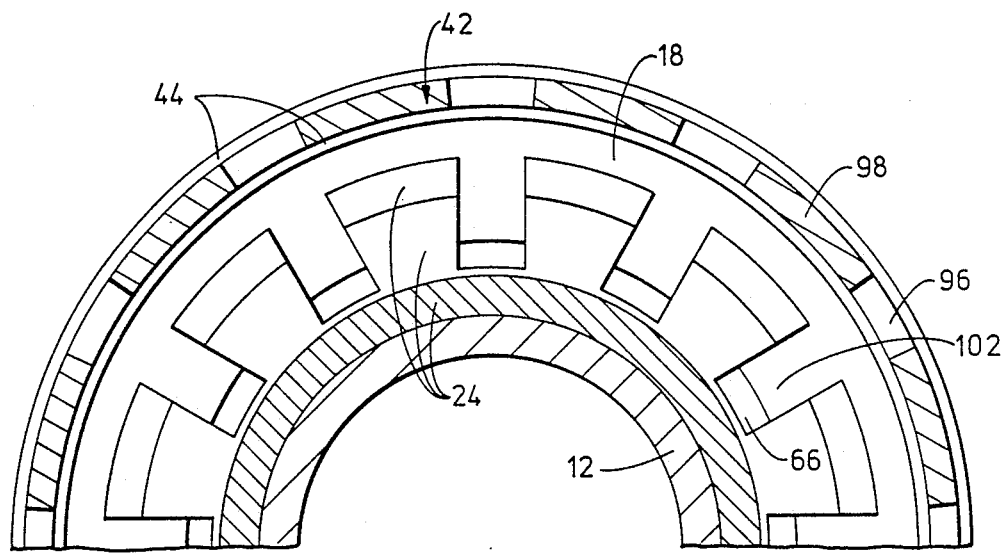
FIG. 2 is a cross-sectional view of a portion of the bearing assembly of FIG. 1 taken along line 2—2 of FIG. 1.

The shaft 12 typically is a rotating flight vehicle engine main shaft 12. The inner race 18 may be of unitary construction or, as shown in FIG. 1, the inner race 18 may include two halves 18a and 18b with an alignment ring 66 added to improve the concentricity of the two halves 18a and 18b of the inner race 18 and to help prevent contact between the ball bearings 16 and the first support ring portion 44.

The first mounting means 38 provides flexibility between the shaft 12 and the inner race 18 which permits each component to expand or contract according to the temperature of each component and its respective thermal expansion coefficient without inducing destructive stresses in the inner ceramic race 18. A similar discussion would apply for the second mounting means 52 providing flexibility between the housing 14 and the outer race 20.

In order to ensure that the first support ring portion 44 remains in contact with the inner race 18 at all operating temperatures, it is designed to have a diametral (radial) interference with the inner race outer surface 46. The maximum value of this interference is chosen such that at room temperature the tensile hoop stress in the first support ring portion 44 is at or below an acceptable stress level for the chosen material. At the maximum operating temperature and rotational speed the first support ring portion 44 would grow more than the inner race 18 due to the higher thermal expansion coefficient and the higher density, larger effective radius and lower Young's Modulus which all combine to produce a radial strain which is greater than that of the inner race 18. The effect is to partially offset the initial interference and to reduce the tensile hoop stress in the first support ring portion 44 and the compressive hoop stress in the inner race 18. The minimum value of the diametral interference is therefore determined by considerations of these effects. A similar discussion would apply to the second support ring portion 58 remaining in contact with the outer race 20.

In addition to conventional cooling, including impingement cooling, of bearing parts such as the ball bearings 16 (all such conventional cooling not shown), the invention provides for supplemental impingement cooling of previously uncooled surfaces. Means 68 are provided for directing cooling air impingingly against the outer surface 70 of the first support ring portion 44 of the first mounting means 38. Preferably such means 68 include one or more or a ring of jets 68 to convey cooling air (see arrows near 68) impingingly against the first support ring portion's outer surface 70. Other means include impingement shrouds having orifice plates and the like, as is known to those skilled in the art. Such impingement cooling minimizes the required interference fit between the inner race 18 and the first support ring portion 44 by generating a differential between the mean temperature of such components. This offsets some of the differential thermal expansion (mostly in the radial direction) between the first support ring portion 44 and the inner race 18 thereby reducing the interference needed to keep the two in contact at the maximum operating temperature. Use of the differential cooling technique widens the margin between the minimum interference needed to keep the parts in contact and the maximum interference which is dictated by the maximum allowable hoop stress in the first support ring portion 44 when cold. Widening this margin increases the maximum temperature to which the bearing 10 can operate successfully. A similar discussion would apply to the outer race 20 and housing 14.

Means 72 are provided in the first air space 40 for directing cooling air (see arrows near 40) impingingly against the bore 74 of the inner race 18, and means 76 are provided in the second air space 54 for directing cooling air (see arrows near 54) impingingly against the outer surface 78 of the second support ring portion 58 of the second mounting means 52. Preferably such means 72 and 76 each include an impingement shroud 80 and 82 having an orifice plate 84 and 86 (a plate 84 and 86 having nozzles 88 and 90 in the shape of holes 88 and 90 or slots) disposed in the first air space 40 between the shaft 12 and each half 18a and 18b of the inner race 18 and in the second air space 54 between the housing 14 and the outer race 20. Other such means include a plurality of orifice plates with offset orifices, a plurality of nozzles in the air spaces to convey the cooling air impingingly against the intended surfaces, and the like, as can be appreciated by those skilled in the art. The cooling air can be supplied to the impingement shrouds 80 and 82 by holes 92 and 94 in the shaft 12 and housing 14.

In order to minimize the cooling flows required, the bearing races 18 and 20 should operate at as high a temperature as possible. This implies that a significant temperature differential may exist between the inner race 18 and the shaft 12 (and the outer race 20 and the housing 14) and in order to accommodate this effect the shaft mating ring portion 48 and the first support ring portion 44 (and the housing mating ring portion 62 and the second support ring portion 58) are separated by the axially extending compliant portion 42 (56) which is a segmented cylindrical flexible connecting member 42 (56). The slits 96 between the segments 98 allow impingement cooling air to exhaust into the bearing cavity 100. Each segment 98 is thin in the radial direction to allow differential growth between the first support ring portion 44 and the shaft mating ring portion 48 (and the second support ring portion 58 and the housing mating ring portion 62). The circumferential length of each segment 98 controls the radial stiffness between the first support ring portion 44 and the shaft mating ring portion 48 (and the second support ring portion 58 and the housing mating ring portion 62). Stiffness is largely controlled by the segments 98 which are aligned with the applied radial load and is a function of radial thickness times the cube of circumferential length. The first (and second) axial race positioning stop ring 24 (and 32) has slots 102 similar to those slits 96 in the flexible connecting member 42 (56) which allow any impingement cooling air supplied to the inner (or outer) race 18 (20) to exhaust into the bearing cavity 100 via the slits 96 in the connecting member 42 (56).

The foregoing description of a preferred embodiment of the invention, which employed a spaced-apart inner race for the shaft and a spaced-apart outer race for the housing, has been presented for purposes of illustration. It is not intended to be exhaustive or to limit the invention in the precise form disclosed, and obviously many modifications and variations are possible in light of the above teaching. For example, another embodiment could utilize just the spaced-apart inner race for the shaft, and a further embodiment could utilize just the paced-apart outer race for the housing. It is intended that the scope of the invention be defined by the claims appended hereto.

We claim:

1. A dry rolling element bearing assembly for rotatably mounting a first race-attachment member to a second race-attachment member, said bearing assembly comprising:
   (a) an inner race;
   (b) first stop means for axially positioning said inner race, said first stop means attachable to said first race-attachment member;
   (c) first mounting means for mounting said inner race to said first race-attachment member;
   (d) an outer race;
   (e) second stop means for axially positioning said outer race, said second stop means attachable to said second race-attachment member;
   (f) second mounting means for mounting said outer race to said second race-attachment member;
   (g) a plurality of rolling elements disposed between said inner and outer races; and
   (h) at least one of said mounting means being attachable to its corresponding said race-attachment member and, when so attached, disposing its corresponding said race radially apart from its corresponding said race-attachment member so as to create an annular air space therebetween, wherein said at least one mounting means has a compliant portion.

2. The bearing assembly of claim 1, wherein said first race-attachment member is a shaft and said second race-attachment member is a housing, and wherein said inner race has an outer surface and said at least one mounting means includes said first mounting means, with said first mounting means disposing said inner race radially outward from said shaft so as to create a first said annular air space therebetween, and said first mounting means having a first compliant portion and having a first support ring portion contacting said outer surface of said inner race with a radial inteference fit when said first mounting means is attached to said shaft.

3. The bearing assembly of claim 2, wherein said first support ring portion has an outer surface, and also including means for directing cooling air impingingly against said outer surface of said first support ring portion of said first mounting means.

4. The bearing assembly of claim 2, wherein said inner race has a bore, and also including means for directing cooling air impingingly against said bore of said inner race, said bore air impingement means disposable in said first annular air space.

5. The bearing assembly of claim 2, wherein said first race-attachment member is a shaft and said second race-attachment member is a housing, and wherein said housing is a generally cylindrical housing, said outer race has an outer surface, and said at least one mounting means includes said second mounting means, with said second mounting means disposing said outer race radially inward from said housing so as to create a second said annular space therebetween, and said second mounting means having a second compliant portion and having a second support ring portion contacting said outer surface of said outer race with a radial interference fit when said first mounting means is attached to said housing.

6. The bearing assembly of claim 5, wherein said second support ring portion has an outer surface, and also including means for directing cooling air impingingly against said outer surface of said second support ring portion of said second mounting means, said second support ring air impingement means disposable in said second annular air space.

7. The bearing assembly of claim 5, wherein said inner race has an outer surface and said at least one mounting means also includes said first mounting means, with said first mounting means disposing said inner race radially outward from said shaft so as to create a first said annular air space therebetween, and said first mounting means having a first compliant portion and having a first support ring portion contacting said outer surface of said inner race with a radial interference fit when said first mounting means is attached to said shaft.

8. The bearing assembly of claim 7, wherein said first support ring portion has an outer surface, and also including means for directing cooling air impingingly against said outer surface of said first support ring portion of said first mounting means.

9. The bearing assembly of claim 7, wherein said inner race has a bore, and also including means for directing cooling air impingingly against said bore of said inner race, said bore air impingement means disposable in said first annular air space.

10. The bearing assembly of claim 7, wherein said second support ring portion has an outer surface, and also including means for directing cooling air impingingly against said outer surface of said second support ring portion of said second mounting means, said second support ring air impingement means disposable in said second annular air space.

11. A dry rolling element bearing assembly for rotatably mounting a first race-attachment member to a second race-attachment member, said bearing assembly comprising:
   (a) an inner race;
   (b) first stop means for axially positioning said inner race, said fist stop means attachable to said first race-attachment member;
   (c) first mounting means for mounting said inner race to said first race-attachment member;
   (d) an outer race;
   (e) second stop means for axially positioning said outer race, said second stop means attachable to said second race-attachment member;
   (f) second mounting means for mounting said outer race to said second race-attachment member;
   (g) a plurality of rolling elements disposed between said inner and outer races; and
   (h) at least one of said mounting means being attachable to its corresponding said race-attachment member and, when so attached, disposing its corresponding said race radially apart from its corresponding said arace-attachment member so as to create an annular air sapce therebetween, and also including means for directing cooling air,s aid air directing means disposable in said annular air space.

12. The bearing assembly assembly of claim 11, wherein said air directing means directs cooling air impingingly against a surface of its corresponding said race when said air directing means is disposed in said annular air space.

* * * * *